US008945390B2

(12) United States Patent
Ichikawa et al.

(10) Patent No.: US 8,945,390 B2
(45) Date of Patent: Feb. 3, 2015

(54) CARBON MEMBRANE AND METHOD FOR PERVAPORATION SEPARATION

(71) Applicant: NGK Insulators, Ltd., Nagoya (JP)

(72) Inventors: Akimasa Ichikawa, Nagoya (JP); Kenji Suzuki, Nagoya (JP); Naoto Kinoshita, Nagoya (JP); Yoshinori Isoda, Nagoya (JP); Takafumi Kimata, Gamagori (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/621,391

(22) Filed: Sep. 17, 2012

(65) Prior Publication Data

US 2013/0015134 A1    Jan. 17, 2013

Related U.S. Application Data

(63) Continuation of application No. PCT/JP2011/056193, filed on Mar. 16, 2011.

(30) Foreign Application Priority Data

Mar. 26, 2010  (JP) ................................. 2010-073050

(51) Int. Cl.
*B01D 61/36* (2006.01)
*B01D 67/00* (2006.01)
*B01D 71/02* (2006.01)
*C08G 8/08* (2006.01)

(52) U.S. Cl.
CPC .......... *B01D 67/0067* (2013.01); *B01D 61/362* (2013.01); *B01D 71/021* (2013.01); *C08G 8/08* (2013.01); *B01D 2323/12* (2013.01)
USPC ................. 210/640; 210/500.21; 210/500.25; 210/500.27; 210/500.36

(58) Field of Classification Search
CPC ............ B01D 67/0067; B01D 71/021; B01D 61/362; B01D 2323/12; B01D 61/36; B01D 61/366; B01D 61/368; B01D 71/02; B01D 2303/08; B01D 2325/22; C08G 8/08
See application file for complete search history.

(56) References Cited

U.S. PATENT DOCUMENTS 5,173,189 A * 12/1992 Hoshi et al. ................... 210/640
6,395,066 B1 * 5/2002 Tanihara et al. ................. 95/47
6,730,364 B2 * 5/2004 Hong et al. ................... 427/535
2004/0182242 A1    9/2004 Mitani et al.
2010/0083837 A1    4/2010 Ichikawa et al.
2011/0266219 A1 * 11/2011 Meuleman et al. ........... 210/640

FOREIGN PATENT DOCUMENTS

| EP | 0 474 424 A2 | 3/1992 |
| JP | 2000-237562 A1 | 9/2000 |
| JP | 2001-232156 A1 | 8/2001 |
| JP | 2004-275858 A1 | 10/2004 |
| JP | 3647985 B2 | 5/2005 |
| JP | 2009-183814 A1 | 8/2009 |
| WO | 2004/074811 A2 | 9/2004 |
| WO | 2008/056803 A2 | 5/2008 |
| WO | 2009/150903 A1 | 12/2009 |
| WO | WO 2010021545 A1 * | 2/2010 |

OTHER PUBLICATIONS

Machine Translation of WO 2009/150903.*
Sakata, Y., et al. "Preparation of porous carbon membrane plates for pervaporation separation applications." Separation and purification technology 17.2 (1999): 97-100.*
Saufi, S. M., and A. F. Ismail. "Fabrication of carbon membranes for gas separation—a review." Carbon 42.2 (2004): 241-259.*
English Translation of WO 2009/150903 made by Schreiber Translations Inc. for the USPTO, Dec. 2013, PTO 14-0916.*
International Search Report and Written Opinion dated May 10, 2011.
Canadian Office Action, Canadian Application No. 2,794,353, dated Jun. 10, 2013 (3 pages).
Nanda Kishore et al., "*Synthesis and Characterization of a Nanofiltration Carbon Membrane Derived from Phenol-Formaldehyde Resin*," Carbon, vol. 41, No. 15, Jan. 1, 2003, pp. 2961-2972.
T.A. Centeno et al., "*Effects of Phenolic Resin Pyrolysis Conditions on Carbon Membrane Performance for Gas Separation*," Journal of Membrane Science, vol. 228, No. 1, Jan. 1, 2004, pp. 45-54.
Extended European Search Report (Application No. 11759275.8) dated Dec. 11, 2013.
Canadian Office Action, Canadian Application No. 2,794,353, dated Jan. 15, 2014 (4 pages).
Canadian Office Action (Application No. 2,794,353) dated Nov. 4, 2014.

* cited by examiner

*Primary Examiner* — Joseph Drodge
(74) *Attorney, Agent, or Firm* — Burr & Brown, PLLC

(57) ABSTRACT

A carbon membrane formed by carbonizing a phenol resin having at least one kind of atomic groups among a methylene bond, a dimethylene ether bond, and a methylol group, wherein the total mole content of the atomic groups is 100 to 180% with respect to the phenolic nuclei. A pervaporation separation method using the carbon membrane is also disclosed.

15 Claims, No Drawings

CARBON MEMBRANE AND METHOD FOR PERVAPORATION SEPARATION

FIELD OF THE INVENTION

The present invention relates to a carbon membrane and a method for pervaporation separation. More specifically, the present invention relates to a carbon membrane used for separating a specific component from a mixture and a method for pervaporation separation using the same.

BACKGROUND OF THE INVENTION

Conventionally, from the viewpoints of environment or energy saving, there has been used a carbon membrane excellent in thermal resistance and chemical stability for the purpose of separating specific gas or the like from a mixture of various gas or the like or for the purpose of separating a specific component from a mixed liquid of various organic solvent such as alcohol or from an aqueous solution.

As such a carbon membrane, there is disclosed a carbon molecular sieve membrane which has a carbon content rate of 80% or more and a large number of pores having a pore diameter of 1 nm or less and which adheres tightly to the surface of a coating layer, which is made with silica sol, alumina sol, or the like and formed on the surface of a porous body having a porosity of 30 to 80% (see Patent Document 1). Moreover, there is disclosed a carbon molecular sieve membrane which has a carbon content rate of 80% or more and a large number of pores having a pore diameter of 0.3 to 4 nm and which has a maximum value of a pore size distribution in the range of 0.6 to 2.0 nm (see Patent Document 2). There is disclosed that, from the viewpoints of high strength of the carbon membrane, good uniformity of the micro pore distribution, and excellent in permselectivity, it is preferable that these carbon molecular sieve membranes are constituted of a glassy carbon obtained by thermal decomposition of phenol resin.

Furthermore, in order to reduce a change of separation performance with lapse of time while having a high separation performance, there is disclosed a porous carbon membrane having water, alcohol, ether, or ketone loaded on a surface or in a pore, or both on the surface and in the pore thereof (see Patent Document 3). As a precursor for forming such a carbon membrane, there is disclosed the use of polyimide resin, lignin, phenol resin, polyvinylidene chloride, polyacrylonitrile, polyfurfuryl alcohol, polyphenylene oxide, cellulose, or the like.

PRIOR ART DOCUMENTS

Patent Documents

Patent Document 1: JP-B-3647985
Patent Document 2: JP-A-2000-237562
Patent Document 3: WO-A1-2009/150903

SUMMARY OF THE INVENTION

The porous carbon membrane disclosed in Patent Document 3 is extremely excellent in separation performance under a model experiment. However, in the case of performing separation of an acidic aqueous solution, acidic organic solvent, or acidic corrosive gas actually, which are used under an actual industrial process, there is a problem that the carbon membrane is deteriorated due to action of an acid, and thereby the selectivity is reduced.

The present invention has been made in view of such a problem of prior art and the objects thereof is to provide a carbon membrane which shows high selectivity, a stable performance for long period of time, and can be used repeatedly even under an actual industrial process for separating various kinds of acidic gas or liquid.

As a result of the present inventors' earnest study in order to solve the aforementioned problem, it has been found out that the aforementioned problem can be solved by the use of a phenol resin which is controlled the total mole content rate of at least one kind of atomic groups selected from the group consisting of a methylene bond, a dimethylene ether bond, and a methylol group, which has led to the completion of the present invention.

That is, according to the present invention, there is provided the following carbon membrane and pervaporation separation method.

[1] A carbon membrane formed by carbonizing a phenol resin having at least one kind of atomic groups selected from a group consisting of a methylene bond, a dimethylene ether bond, and a methylol group, wherein a total mole content rate of the atomic groups is 100 to 180% with respect to a phenolic nuclei.

[2] The carbon membrane according to [1], wherein a weight-average molecular weight of the phenol resin is 200 to 10000.

[3] The carbon membrane accord: ng [1] or [2], wherein at least one kind selected from a group consisting of water, alcohol, ether, and ketone is loaded on a surface and/or in pores.

[4] The carbon membrane according to any one of [1] to [3], which is obtained by carbonizing the phenol resin at a temperature of 600 to 900° C.

[5] A pervaporation separation method comprising: bringing a supply liquid containing two or more kinds of components into contact with a carbon membrane according to any one of [1] to [4], cooling a gas having passed through the carbon membrane, and separating a resultant as a permeation liquid containing a specific component.

[6] The pervaporation separation method according to [5], the method comprising: bringing the supply liquid containing an acidic component into contact with the carbon membrane, cooling a gas having passed through the carbon membrane, and separating the resultant as a permeation liquid containing a specific component.

[7] The pervaporation separation method according to [6], wherein the acidic component is hydrochloric acid, sulfuric acid, or nitric acid.

[8] The pervaporation separation method according to [6] or [7], wherein a content rate of the acidic component is 0.001 to 0.2% with respect to the total amount of the supply liquid.

A carbon membrane of the present invention effects such that it shows high selectivity, a stable performance for long period of time, and can be used repeatedly even under an actual industrial process for separating various kinds of acidic gas or liquid.

In addition, according to a pervaporation separation method of the present invention, there is exhibited an effect of being able to separate a specific component from a mixture with high selectivity.

DETAILED DESCRIPTION OF THE INVENTION

Hereinbelow, embodiments of the present invention will be described. However, the present invention is not limited to the following embodiments. It should be understood that ones being added appropriate changes, improvements, and the like to the following embodiments on the basis of ordinary knowledge of a person skilled in the art within a range of not deviating from the gist of the present invention are included.

1. Carbon Membrane:

A carbon membrane of the present invention is the one obtained by carbonizing a phenol resin where the total mole content rate of the atomic groups, which is at least one kind of atomic groups selected from the group consisting of a methylene bond, a dimethylene ether bond, and a methylol group is 100 to 180% with respect to the phenolic nuclei. The carbon membrane obtained by carbonizing such a phenol resin has a more stable crystal structure in comparison with a conventional carbon membrane. Therefore, it seems that acid resistance is improved.

A carbon membrane obtained by carbonizing a phenol resin has conventionally been known. However, the carbon membrane of the present invention is obtained by carbonizing a phenol resin in which a total mole content ratio of atomic groups is within a predetermined range. Therefore, a carbon membrane precursor after a thermal treatment becomes a bulky structure to obtain the carbon membrane being rich in nanopores. Thus, in addition to the large permeation amount, acid resistance is improved. As a result, the carbon membrane of the present invention shows high selectivity, stable performance for long period of time, and can be used repeatedly even under an actual industrial process for separating various kinds of acidic gas or liquid.

(Phenol Resin)

A phenol resin is one of thermosetting resins subjected phenol and aldehyde to condensation polymerization. The phenol resin used for the carbon membrane of the present invention is the one where a total mole content rate of atomic groups is 100 to 180% with respect to phenolic nuclei. Incidentally, the atomic groups are bonded to a carbon atoms of any phenolic nuclei.

The total mole content rate, of the phenol resin, of at least one kind of atomic groups selected from the group consisting of a methylene bond, a dimethylene ether bond, and a methylol group is 100 to 180%, preferably 110 to 150%, further preferably 110 to 130% with respect to the phenolic nuclei. As the total mole content rate of the atomic group is within such a range, the carbon membrane precursor after a thermal treatment becomes a bulky structure, and a carbon membrane being rich in nanopores can be obtained. Therefore, in addition to the high permeation amount, it seems that acid resistance is improved.

The total mole content rate, of the phenol resin, of at least one kind of atomic groups selected from the group consisting of a methylene bond, a dimethylene ether bond, and a methylol group can be calculated according to a method described in Thermosetting Resin, vol. 14, No. 4 (1993), pp. 8-12.

Specifically it can be calculated as follows. Firstly, $^1$H-NMR spectrum of a sample obtained by acetylating a phenol resin with pyridine/acetic acid anhydride is measured. Next, the measurement results are substituted into the following formulae to calculate the number of phenolic nuclei of the phenol resin, the number of methylene bonds, the number of dimethylene ether bonds, the number of methylol groups, and the number of hydroxymethoxy methyl groups.

$M_1$ (number of phenolic nuclei)=$S_1/3-S_4/2$ $M_2$ (number of methylene bonds)=$S_2/2$ $M_3$ (number of dimethylene ether bonds)=$S_3/4$ $M_4$ (number of methylol groups)=$S_4/2-S_5/2$ $M_5$ (number of hydroxymethoxymethyl groups)=$S_5/2$ Incidentally, in each of the formulae, $S_1$ shows a peak area where the δ value is 1.80 to 2.50 ppm (belonging to $ArOCH_3$, $ArCH_2OCH_3$, $ArCH_2OCH_2OCH_3$). $S_2$ shows a peak area where the δ value is 3.00 to 4.10 ppm (belonging to $PhCH_2Ph$). $S_3$ shows a peak area where the δ value is 4.10 to 4.65 ppm (belonging to $ArCH_2OCH_2Ar$). $S_4$ shows a peak area where the δ value is 4.65 to 5.07 ppm (belonging to $PhCH_2OAc$, $PhCH_2OCH_2OAc$). $S_5$ shows a peak area where the δ value is 5.07 to 5.40 ppm (belonging to $PhCH_2OCH_2OAc$).

Next, the values calculated from the aforementioned formulae are substituted into the following formula to be able to calculate the total mole content rate of at least one kind of atomic groups selected from the group consisting of a methylene bond, a dimethylene ether bond, and a methylol group of a phenol resin.

Mole content rate (%)=$(M_2+M_3+M_4)/M_1$

The weight-average molecular weight of the phenol resin is preferably 200 to 10000, more preferably 3000 to 10000, and particularly preferably 4000 to 10000. As the weight-average molecular weight is within such a range, the membrane having high selectivity can be obtained. When the weight-average molecular weight is above 10000, a defect is easily caused by shrinkage of the membrane upon a thermal treatment or upon carbonization to make the selectivity reduce. When the weight-average molecular weight is below 200, it may be impossible to form a carbon membrane having a uniform thickness.

The weight-average molecular weight can be measured according to a conventionally known method. However, in the present invention, it is a value measured as in terms of polystyrene by a gel permeation chromatography (GPC).

As such a phenol resin, there is not particularly limited, and a commercialized product can be used. For, example, there includes trade names of "Bellpearl S899", "Bellpearl S890", "Bellpearl S870" (they are produced by Air Water, Inc.), trade name of "Sumilite Resin 53056" (produced by Sumitomo Bakelite Co., Ltd.), trade name of "Resitop PSK2320", trade name of "Maririn (phonetic spelling) HF" (these are produced by Gun Ei Chemical Industry, Co., Ltd.).

(Carbon Membrane)

The carbon membrane of the present invention is preferably a carbon membrane where at least one kind selected from the group consisting of water, alcohol, ether, and ketone is loaded on a surface and/or in pores. By loading a loaded component, the selectivity can be improved. It seems that this is for narrowing the pores by loading the component to be loaded in the pores by adsorption, additional reaction, or the like (i.e., forming a steric hindrance in the pores), thereby inhibiting a component having a large molecular diameter, particularly a linear or planar component from passing through the pores. Among these components to be loaded, water, acetone, linear alcohol, or linear ether is preferable, and at least one kind selected from the group consisting of water, acetone, methanol, ethanol, n-propyl alcohol, and n-butyl alcohol is more preferable.

The molecular weight of a component to be loaded is preferably 100 or less, more preferably 30 to 100, particularly preferably 40 to 100. When the molecular weight is above 100, pores are clogged, and the permeation amount of the target component to be separated may be reduced. On the other hand, when it is below 30, the effect of narrowing the pores may be impaired.

In the carbon membrane, the mass of the component to be loaded with respect to the mass of the membrane is preferably 100 to 5000 ppm. When it is below 100 ppm, the effect of improving selectivity may deteriorate. On the other hand, when it is above 5000 ppm, the pores are clogged, and the permeation amount of the target component to be separated may be reduced.

The average pore size of the carbon membrane is preferably 0.2 to 1.0 nm. When the average pore size is below 0.2 nm, the component to be loaded clogs the pores, and the permeation amount of the target component to be separated may be reduced. On the other hand, when it is above 1.0 nm, the effect of improving selectivity in the case of loading the component to be loaded may deteriorate. Incidentally, the average pore size of the carbon membrane is a value measured by the gas adsorption method.

The thickness of the carbon membrane is preferably 0.01 to 10 μm, more preferably 0.01 to 0.5 μm. When the thickness is smaller than 0.01 μm, the selectivity may be reduced, or the strength may be reduced. On the other hand, when the thickness is larger than 10 μm, the permeability of the target component to be separated may be reduced. Incidentally, the thickness of the carbon membrane is a value measured by the use of an electron microscope.

(Method for Manufacturing Carbon Membrane)

The method for manufacturing a carbon membrane will be described each step. Incidentally, the carbon membrane may be formed on the surface of the porous substrate. Moreover, the carbon membrane may be formed as a self-supported membrane by a method such as formation of a hollow string membrane without using a porous substrate. However, from the viewpoint of improving the strength and the durability of the carbon membrane, it is preferable to form the carbon membrane on a surface of the porous substrate.

Though the porous substrate is not particularly limited, it is preferable to use a ceramic porous body. Specific materials for the ceramic porous substrate include alumina, silica, cordierite, and the like.

It is preferable that the porous substrate has an average pore size of 0.01 to 10 μm and a porosity of 30 to 70%. When the average pore size of the porous substrate is smaller than 0.01 μm, the pressure loss may increase. On the other hand, when it is larger than 10 μm, strength of the porous substrate may be reduced. Moreover, when the porosity of the porous substrate is below 30%, permeability of the target component to be separated may be reduced. On the other hand, when it is above 70%, the strength of the porous substrate may be reduced.

Incidentally, the "average pore size" is a value measured by mercury intrusion technique. The "porosity" is a value measured by the Archimedes method.

Moreover, the shape of the porous substrate is not particularly limited, and the shape may appropriately be selected according to the purpose of use of the carbon membrane. For example, there includes a plate shape such as a disc shape and a polygonal plate shape; a lotus root shape where a plurality of through-holes are formed inside a columnar body (hereinbelow referred to as a "monolith shape"); a cylindrical shape such as a honeycomb shape, a circular cylindrical shape, and a polygonal cylindrical shape; and a columnar shape such as a circular columnar shape and a polygonal columnar shape. Since the membrane area ratio to the capacity and weight is large, a monolith shape and a honeycomb shape are particularly desirable. In addition, the size of the porous substrate is not particularly limited, and the size may suitably be selected according to the purpose with the range where the necessary strength as a support is fulfilled and where the permeability of the target component to be separated is not impaired.

A method for forming a carbon membrane on a surface of a porous substrate is as follows. Firstly, a precursor solution of a phenol resin is applied on a surface of the porous substrate by a spin coating method, a dipping method or the like. Next, the porous substrate applied the phenol resin on the surface thereof is subjected to a thermal treatment at 90 to 300° C. for 0.5 to 60 hours to obtain a carbon membrane precursor. The thickness of the carbon membrane precursor is preferably 0.01 to 10 μm, more preferably 0.01 to 0.5 μm.

Incidentally, in the case of forming a carbon membrane on the Surface of the porous substrate, it is preferable to use a phenol resin precursor solution where the phenol resin is suspended without being completely dissolved in the solvent. This is for inhibiting permeation by depositing it on the surface of the porous substrate to form a membrane uniformly since the viscosity of the phenol resin precursor solution is low.

Next, the carbon membrane precursor is carbonized by a thermal treatment under predetermined conditions to obtain a carbon membrane. The atmosphere upon subjecting the carbon membrane precursor to the thermal treatment is preferably a non-oxidizing atmosphere. The non-oxidizing atmosphere is an atmosphere where the carbon membrane precursor is not oxidized even by being heated in a temperature range of the thermal treatment. Specifically, it is an inert gas atmosphere such as nitrogen and argon, an atmosphere of a vacuum state or the like.

Moreover, the temperature for subjecting the carbon membrane precursor to a thermal treatment is preferably 600 to 1200° C., more preferably 600 to 900° C., particularly preferably 650 to 800° C. When it is below 600° C., since carbonization becomes insufficient, pores cannot be formed, and it may not exhibit the separation performance. On the other hand, when it is above 1200° C., strength may be reduced, or the membrane becomes too dense, and therefore the separation performance may be reduced.

In addition, a method for forming a carbon membrane as a self-supported membrane by a method of manufacturing a hollow string membrane or a film without using a porous substrate is as follows. Firstly, a phenol resin precursor solution as a raw material for a carbon membrane is prepared, and a hollow string membrane is formed by a method where the raw material is extruded to have a hollow string shape from a spinning nozzle and coagulated by immersion in a coagulation solvent. Then, the hollow string membrane is carbonized by a thermal treatment under predetermined conditions to obtain a carbon membrane.

It is preferable to subject the carbon membrane obtained in such a manner to a treatment for loading a component to be loaded thereon (hereinbelow sometimes referred to as a "loading treatment"). This treatment can be performed by allowing the component to be loaded to permeate or by immersing a carbon membrane into a component to be loaded. By the loading treatment, the component to be loaded can be loaded in the pores of the carbon membrane, and selectivity of the desired component can be improved upon separating various kinds of mixed gas or mixed liquid. Furthermore, the clogging of pores to be caused by the absorption of moisture in under storage atmosphere during storage when thus obtained carbon membrane is stored, and components to be separated or the like when the carbon membrane is used for the separation of the target components can be inhibited. Therefore, high permeability can be maintained stably.

As conditions for allowing a component to be loaded to permeate a carbon membrane, it is preferable that the permeation flux is 0.01 to 10 kg/m$^2$·h, the temperature is 0 to 200° C., and permeation time is 1 second to 5 hours; and it is more preferable that the permeation flux is 0.1 to 1 kg/m$^2$·h, the temperature is 20 to 100° C., and the permeation time is 10 seconds to 1 hour. When the permeation flux is smaller than 0.01 kg/m$^2$·h, the treatment time may become long. On the other hand, when it is larger than 10 kg/m²·h, a large amount of the component to be loaded may be necessary. Moreover, when the temperature is lower than 0° C., it may be impossible to obtain a desired permeation flux. On the other hand, when it is higher than 200° C., it has a high risk of catching fire of the component to be loaded, etc. When the permeation time is shorter than 1 second, the component to be loaded may hardly be adsorbed in the pores of the carbon membrane. On the other hand, when it is longer than 5 hours, time may be spent unnecessarily.

The treatment of allowing the component to be loaded to permeate is preferably repeated one to ten times. When the number is more than 10 times, many operations may be performed unnecessarily.

In addition, as conditions upon immersing the carbon membrane in the component to be loaded, it is preferable that the temperature is 50 to 100° C., and the immersion time is 1 minute to 24 hours. When the temperature is lower than 50° C., the loaded component may hardly be loaded. On the other hand, when it is higher than 100° C., it may have a high risk of catching fire of the component to be loaded, etc. When the immersion time is shorter than 1 minute, the loaded component may hardly be adsorbed in the pores of the carbon membrane. On the other hand, when it is longer than 24 hours, time may be spent unnecessarily.

The treatment of immersing the carbon membrane in the component to be loaded is preferably repeated one to ten times. When the number is more than 10 times, many operations may be performed unnecessarily.

After the component to be loaded is adsorbed in the pores of the carbon membrane, the loaded component is bonded more tightly by heating. The temperature for heating is 50 to 200° C. When it is lower than 50° C., the loaded component may hardly be bonded to the carbon membrane. In addition, a high temperature condition higher than 200° C. is not necessary.

When the component to be loaded is loaded in the pores of the carbon membrane, it is preferable that the loading amount is saturated to have a state where no more loading can be conducted. This can inhibit the moisture or the like under the storage atmosphere from clogging the pores by adsorbing in the pores when the carbon membrane is stored or used. Therefore, high separation performance can be maintained stably.

II. Pervaporation Separation Method

A pervaporation separation method is a membrane separation method where a liquid is brought into contact with a membrane, the liquid is evaporated through the membrane, the gas passed through the membrane is cooled and separated as a permeation liquid containing a specific component. The pervaporation separation method of the present invention is a method where a supply liquid containing two or more kinds of components is brought into contact with the carbon membrane described in "I. Carbon membrane", the gas passed through the carbon membrane is cooled and separated the resultant as a permeation liquid containing a specific component. Since the carbon membrane shows high selectivity, stable performance for long period of time, and can be used repeatedly even under an industrial process for separating various kinds of acidic gas or liquid, the pervaporation separation method of the present invention can separate a specific component to be separated with high selectivity from the supply liquid containing two or more components.

In particular, even if an acidic component is contained in the supply liquid, since the carbon membrane is excellent in acid resistance and is hardly deteriorated, separation can be performed with higher selectivity than in the case of using a conventional carbon membrane. The high selectivity is particularly remarkable in the case of hydrochloric acid, sulfuric acid, or nitric acid, which are generally classified as strong acids as the acidic component.

The content rate of the acidic component is preferably 0.001 to 0.2% with respect to the total amount of the supply liquid. The content rate of the acidic component within this range enables the effect that the carbon membrane of the present invention can be used repeatedly under an actual industrial process for separating various kinds of acidic gases or liquids to be exhibited most effectively. That is, when the content rate of the acidic component is below 0.001%, there is a case where a conventional carbon membrane may be used repeatedly under an actual industrial process. On the other hand, when it is above 0.2%, the separation performance may be slightly reduced, but the reduction is not as large as the reduction in the case of using a conventional carbon membrane.

EXAMPLES

Hereinbelow, the present invention will be described specifically based on Examples. However, the present invention is not limited to these Examples. Incidentally, "%" in Examples and Comparable Examples is based on mass unless otherwise noted. In addition, measurement methods of various kinds of physical properties are shown below.

[Total mole content rate (%) of atomic groups]: Firstly, $^1$H-NMR spectrum of a sample obtained by acetylating a phenol resin with pyridine/acetic acid anhydride was measured and substituted into the following formulae to calculate the number of phenolic nuclei, the number of methylene bonds, the number of dimethylene ether bonds, the number of methylol groups, and the number of hydroxymethoxy methyl groups, of the phenol resin.

$M_1$ (number of phenolic nuclei)=$S_1/3-S_4/2$ $M_2$ (number of methylene bonds)=$S_2/2$ $M_3$ (number of dimethylene ether bonds)=$S_3/4$ $M_4$ (number of methylol groups)=$S_4/2-S_5/2$ $M_5$ (number of hydroxymethoxymethyl groups)=$S_5/2$ In each of the formulae, $S_1$ shows a peak area where the δ value is 1.80 to 2.50 ppm (belonging to $ArOCH_3$, $ArCH_2OCH_3$, $ArCH_2OCH_2OCH_3$). $S_2$ shows a peak area where the δ value is 3.00 to 4.10 ppm (belonging to $PhCH_2Ph$). $S_3$ shows a peak area where the δ value is 4.10 to 4.65 ppm (belonging to $ArCH_2OCH_2Ar$). $S_4$ shows a peak area where the δ value is 4.65 to 5.07 ppm (belonging to $PhCH_2OAc$, $PhCH_2OCH_2OAc$). $S_5$ shows a peak area where the δ value is 5.07 to 5.40 ppm (belonging to $PhCH_2OCH_2OAc$).

Next, the values calculated from the aforementioned formulae were substituted into the following formula to calculate the total mole content rate of atomic groups of a phenol resin.

Mole content rate (%)=$(M_2+M_3+M_4)/M_1$

[Weight-average molecular weight]: Average molecular weight indicated on a commercialized product.

[Separation coefficient α]: The separation coefficient was calculated by substituting each concentration in the following formula.

Separation coefficient α=((water concentration of permeation liquid)/(ethanol concentration of permeation liquid))/((water concentration of supply liquid)/(ethanol concentration of supply liquid))

[α/αin]: It was calculated from the values of the calculated initial separation coefficient αin and separation coefficient α after the acid treatment. When the value is close to 1 or is 1 or more, it could be said that it is more excellent in acid resistance. Incidentally, the case of below 0.80 was evaluated as "inferior", the case of 0.80 to 0.90 was evaluated as "good", and the case of above 0.90 was evaluated as "excellent".

[Permeation flux (Flux) (kg/m² h)]: The permeation liquid from the porous substrate side face was trapped by liquid nitrogen trap in the pervaporation separation test, and the permeation flux was calculated by dividing the mass of the trapped permeation liquid volume by the sampling time and the membrane area.

Examples 1 to 21 and Comparative Examples 1 to 8

After deposition was performed by a filtration membrane formation method using slurry containing alumina particles having an average particle diameter of 3 μm on a monolith-shaped porous substrate which has an average pore size of 12 μm and which is made with an alumina particles having an average particle diameter of 50 μm, firing was performed to form the first surface dense layer having a thickness of 200 μm and an average pore size of 0.6 μm. After deposition was further performed by a filtration membrane formation method using slurry containing titania particles having an average particle diameter of 0.3 μm on the first surface dense layer, firing was performed to form the second surface dense layer having a thickness of 30 μm and an average pore size of 0.1 μm. The porosity of the entire porous substrate was 50%.

The various kinds of precursor solutions for carbon membranes shown in Table 1 were applied onto the porous substrate by dipping method. Next, after a thermal treatment was performed at 200 to 350° C. under atmosphere, carbonization at the carbonization temperatures shown in Table 1 was performed under a nitrogen atmosphere to obtain carbon membranes. The carbon membranes were treated under various treatment conditions shown in Table 2. The initial separation performance of each of the carbon membranes obtained above and the separation performance after the treatment under various acidic conditions shown in Table 2 were evaluated by water-ethanol pervaporation separation method (Test conditions: water/EtOH=10/90 (mass ratio), supply liquid temperature of 70° C., permeation side pressure of 6.7 kPa).

TABLE 1

|  | Kinds of precursor solution | Total mole content rate of atomic groups (mole %) | weight-average molecular weight | Carbonization temperature (° C.) |
|---|---|---|---|---|
| Ex. 1 | A | 110 | 4000 | 500 |
| Ex. 2 | A | 110 | 4000 | 550 |
| Ex. 3 | A | 110 | 4000 | 650 |
| Ex. 4 | A | 110 | 4000 | 700 |
| Ex. 5 | A | 110 | 4000 | 800 |
| Ex. 6 | A | 110 | 4000 | 700 |
| Ex. 7 | A | 110 | 4000 | 650 |
| Ex. 8 | A | 110 | 4000 | 700 |
| Ex. 9 | B | 180 | 200 | 650 |
| Ex. 10 | C | 160 | 1500 | 700 |
| Ex. 11 | A | 110 | 4000 | 650 |
| Ex. 12 | A | 110 | 4000 | 650 |
| Ex. 13 | A | 110 | 4000 | 650 |
| Ex. 14 | A | 110 | 4000 | 650 |
| Ex. 15 | D | 150 | 3000 | 700 |
| Ex. 16 | E | 110 | 10000 | 700 |
| Ex. 17 | F | 120 | >10000 | 700 |
| Ex. 18 | A | 110 | 4000 | 700 |
| Ex. 19 | A | 110 | 4000 | 700 |

TABLE 1-continued

|  | Kinds of precursor solution | Total mole content rate of atomic groups (mole %) | weight-average molecular weight | Carbonization temperature (° C.) |
|---|---|---|---|---|
| Ex. 20 | A | 110 | 4000 | 700 |
| Comp. Ex. 1 | G | — | — | 650 |
| Comp. Ex. 2 | H | — | — | 600 |
| Comp. Ex. 3 | I | — | — | 700 |
| Comp. Ex. 4 | I | — | — | 700 |
| Comp. Ex. 5 | I | — | — | 700 |
| Comp. Ex. 6 | I | — | — | 700 |
| Comp. Ex. 7 | J | 90 | >10000 | 700 |
| Comp. Ex. 8 | K | 200 | 168 | 700 |
| Ex. 21 | F | 120 | >10000 | 700 |

TABLE 2

|  | Treatment condition | Initial separation coefficient αin | Initial Flux (kg/m²h) |
|---|---|---|---|
| Ex. 1 | X1 | 32 | 1.0 |
| Ex. 2 | X1 | 12 | 1.2 |
| Ex. 3 | X1 | 126 | 1.6 |
| Ex. 4 | X1 | 153 | 1.4 |
| Ex. 5 | X1 | 360 | 1.0 |
| Ex. 6 | X2 | 188 | 1.2 |
| Ex. 7 | X1 | 123 | 1.6 |
| Ex. 8 | X3 | 102 | 1.5 |
| Ex. 9 | X1 | 112 | 1.1 |
| Ex. 10 | X1 | 185 | 1.0 |
| Ex. 11 | X1 | 125 | 1.6 |
| Ex. 12 | X1 | 126 | 1.6 |
| Ex. 13 | None | 24 | 1.7 |
| Ex. 14 | X1 | 125 | 1.6 |
| Ex. 15 | X1 | 145 | 1.3 |
| Ex. 16 | X1 | 137 | 1.4 |
| Ex. 17 | X1 | 82 | 1.4 |
| Ex. 18 | X1 | 150 | 1.4 |
| Ex. 19 | X1 | 151 | 1.4 |
| Ex. 20 | X1 | 148 | 1.4 |
| Comp. Ex. 1 | X1 | 132 | 1.2 |
| Comp. Ex. 2 | X1 | 107 | 1.3 |
| Comp. Ex. 3 | X1 | 141 | 1.7 |
| Comp. Ex. 4 | X1 | 140 | 1.7 |
| Comp. Ex. 5 | X1 | 142 | 1.7 |
| Comp. Ex. 6 | None | 25 | 1.8 |
| Comp. Ex. 7 | X1 | 142 | 1.5 |
| Comp. Ex. 8 | X1 | 145 | 1.0 |
| Ex. 21 | None | 22 | 1.5 |

|  | Immersion condition | Separation coefficient after immersion α | Flux after immersion (kg/m²h) | α/αin |
|---|---|---|---|---|
| Ex. 1 | Y1 | 30 | 1.0 | 0.94 (Excellent) |
| Ex. 2 | Y1 | 11 | 1.2 | 0.92 (Excellent) |
| Ex. 3 | Y1 | 132 | 1.6 | 1.05 (Excellent) |
| Ex. 4 | Y1 | 153 | 1.4 | 1.00 (Excellent) |
| Ex. 5 | Y1 | 359 | 1.0 | 1.00 (Excellent) |

TABLE 2-continued

| | | | | | |
|---|---|---|---|---|---|
| Ex. 6 | Y1 | 190 | 1.2 | 1.01 | (Excellent) |
| Ex. 7 | Y2 | 123 | 1.6 | 1.00 | (Excellent) |
| Ex. 8 | Y1 | 110 | 1.5 | 1.08 | (Excellent) |
| Ex. 9 | Y1 | 113 | 1.1 | 1.01 | (Excellent) |
| Ex. 10 | Y1 | 185 | 1.0 | 1.00 | (Excellent) |
| Ex. 11 | Y3 | 125 | 1.6 | 1.00 | (Excellent) |
| Ex. 12 | Y4 | 128 | 1.6 | 1.02 | (Excellent) |
| Ex. 13 | Y1 | 20 | 1.7 | 0.83 | (Good) |
| Ex. 14 | Y5 | 130 | 1.6 | 1.04 | (Excellent) |
| Ex. 15 | Y1 | 145 | 1.3 | 1.00 | (Excellent) |
| Ex. 16 | Y1 | 138 | 1.4 | 1.01 | (Excellent) |
| Ex. 17 | Y1 | 83 | 1.4 | 1.01 | (Excellent) |
| Ex. 18 | Y6 | 150 | 1.4 | 1.00 | (Excellent) |
| Ex. 19 | Y7 | 151 | 1.4 | 1.00 | (Excellent) |
| Ex. 20 | Y8 | 140 | 1.4 | 0.95 | (Excellent) |
| Comp. Ex. 1 | Y1 | 21 | 1.3 | 0.16 | (inferior) |
| Comp. Ex. 2 | Y1 | 10 | 1.5 | 0.09 | (inferior) |
| Comp. Ex. 3 | Y1 | 7 | 2.3 | 0.05 | (inferior) |
| Comp. Ex. 4 | Y4 | 15 | 2.0 | 0.11 | (inferior) |
| Comp. Ex. 5 | Y5 | 8 | 2.3 | 0.06 | (inferior) |
| Comp. Ex. 6 | Y1 | 2 | 3.5 | 0.08 | (inferior) |
| Comp. Ex. 7 | Y5 | 110 | 1.5 | 0.77 | (inferior) |
| Comp. Ex. 8 | Y5 | 103 | 1.0 | 0.71 | (inferior) |
| Ex. 21 | Y1 | 10 | 1.6 | 0.45 | (inferior) |

Incidentally, the kinds of each of the precursor solutions for carbon membranes used in Examples 1 to 21 and Comparative Examples 1 to 8, each of treatment conditions, and each of acidic conditions are shown below.

(Precursor Solution)

A=phenol resin, trade name of "Bellpearl S899" (produced by Air Water, Inc., weight-average molecular weight=4000)

B=phenol resin, trade name of "Sumilite Resin 53056" (produced by Sumitomo Bakelite, Co., Ltd., weight-average molecular weight=200)

C=phenol resin, trade name of "Resitop PSK2320" (produced by Gun Ei Chemical Industry Co., Ltd., weight-average molecular weight=1500)

D=phenol resin, trade name of "Maririn (phonetic spelling) HF" (produced by Gun Ei Chemical Industry Co., Ltd., weight-average molecular weight=3000)

E=phenol resin, trade name of "Bellpearl S890" (produced by Air Water, Inc., weight-average molecular weight=10000)

F=phenol resin, trade name of "Bellpearl S870" (produced by Air. Water, Inc., weight-average molecular weight=>10000)

G=polyacrylonitrile resin, trade name of "taftic A-20" (produced by Toyobo Co., Ltd.)

H=polyfurfuryl alcohol

I=polyimide resin, trade name of "U-Varnish A" (produced by Ube Industries, Ltd.)

J=phenol resin, trade name of "Bellpearl S830" (produced by Air Water, Inc., weight-average molecular weight=>10000)

K=phenol resin, trade name of "Methylol Compound 26DMPC" (produced by Asahi Organic Chemicals Industry Co. Ltd., Weight-average molecular weight=168)

(Treatment Condition)

X1: After immersion in a water-ethanol 50%/50% mixed solution at 80° C. for 3 hours, heating at 80° C. for 100 hours.

X2: After immersion in a water-acetone 50%/50% mixed solution at 50° C. for 3 hours, heating at 80° C. for 100 hours.

X3: After immersion in water at 80° C. for 3 hours, heating at 80° C. for 100 hours.

(Acidic Condition)

Y1: Immersion in 10% sulfuric acid aqueous solution at 80° C. for 40 hours

Y2: Immersion in 10% hydrochloric acid aqueous solution at 80° C. for 40 hours

Y3: Immersion in 10% nitric acid aqueous solution at 80° C. for 40 hours

Y4: Immersion in 70% acetic acid aqueous solution at 80° C. for 40 hours

Y5: 0.1% of sulfuric acid was added to the supply liquid (water/EtOH=10%/90%) for pervaporation separation, and the test was carried out for 40 hours.

Y6: 0.001% of sulfuric acid was added to the supply liquid (water/EtOH=10%/90%) for pervaporation separation, and the test was carried out for 40 hours.

Y7: 0.2% of sulfuric acid was added to the supply liquid (water/EtOH=10%/90%) for pervaporation separation, and the test was carried out for 40 hours.

Y8: 0.3% of sulfuric acid was added to the supply liquid (water/EtOH=100/900) for pervaporation separation, and the test was carried out for 40 hours.

As one may understand from Comparative Examples 1 to 6, in a carbon membrane using a precursor solution prepared from polyacrylonitrile resin, polyimide resin, or polyfurfuryl alcohol resin, selectivity was reduced to a large extent by immersion in acid or by addition of sulfuric acid in the supply liquid. In addition, as one may understand from Comparative Examples 7 and 8, even in a carbon membrane using a precursor solution prepared from a phenol resin, in the case that the mole content rate of atomic groups was without the range (100 to 180%) of the present invention, the selectivity was reduced to a large extent by addition of sulfuric acid to the supply liquid.

On the other hand, as one may understand from Examples 1 to 21, in a carbon membrane using a precursor solution prepared from various phenol resins, there was no large reduction of selectivity due to immersion in acid or addition of sulfuric acid to the supply liquid.

In Example 13, where the separation test was performed by adding sulfuric acid to the supply liquid containing a target component to be separated without loading a loaded component, the initial selectivity was low, and selectivity was slightly reduced after immersion in acid. However, the reduction of selectivity was not so large as in Comparative Examples 1 to 8. In particular, in comparison with the result of Example 21, it can be understood that, when the weight-average molecular weight of the phenol resin is 200 to 10000, a carbon membrane excellent in acid resistance can be obtained even without performing a loading treatment.

When the precursor solution A or E (Examples 4, 16), where the total mole content rate of atomic groups is 110% with respect to phenolic nuclei, or the precursor solution D (Example 15), where the total mole content rate of atomic groups is 150% with respect to phenolic nuclei, were used, high permeation amount was obtained in comparison with the case of using the precursor solution B (Example 9), where the total mole content rate of atomic groups is 180%, or the precursor solution C (Example 10), where the total mole content rate of atomic groups is 160%. Moreover, when the precursor solution F (Example 17), where the weight-average molecular weight was above 10000, was used, the initial selectivity was low.

As a result of studying a content rate of sulfuric acid with regard to the supply liquid (water/EtOH=10%/90%) for pervaporation separation, no change was found in the separation performance when it was 0.01 to 0.2% (Examples 14, 18, 19). On the other hand, when the content rate was 0.3% (above 0.2%) (Example 20), selectivity was slightly reduced through the selectivity was not so large as in Comparative Examples 1 to 8.

INDUSTRIAL APPLICABILITY

A carbon membrane of the present invention can be used for a filter for separating a specific substance (gas, liquid) from the mixture of a plurality of substances (gas, liquid). In particular, it can be repeatedly used since the selectivity is not reduced even if an acidic component is contained in the mixture. Therefore, the use in an industrial process can be expected.

The invention claimed is:

1. A carbon membrane formed by subjecting a precursor solution of a phenol resin having at least one kind of atomic groups selected from a group consisting of a methylene bond, a dimethylene ether bond, and a methylol group to a thermal treatment at 200 to 350° C. under atmosphere and carbonizing the resulting phenol resin,
   wherein a total mole content rate of the atomic groups is 100 to 180% with respect to a phenolic nuclei,
   wherein the thickness of the carbon membrane is 0.01 to 10 μm,
   wherein the carbon membrane has a ratio of separation coefficient ($\alpha$) after exposure to an acidic condition to initial separation coefficient ($\alpha^{in}$) of at least about 0.90 and
   wherein the acidic condition consists of at least one of immersion in a 10% sulfuric acid aqueous solution at 80° C. for 40 hours, immersion in a 10% hydrochloric acid aqueous solution at 80° C. for 40 hours, and immersion in a 70% acetic acid aqueous solution at 80° C. for 40 hours.

2. The carbon membrane according to claim 1, wherein a weight-average molecular weight of the phenol resin is 200 to 10000.

3. The carbon membrane according to claim 2, wherein at least one species selected from the group consisting of water, alcohol, ether, and ketone is loaded on a surface and/or in pores of the carbon membrane.

4. The carbon membrane according to claim 3, wherein the phenol resin is carbonized at a temperature of 600 to 900° C.

5. The carbon membrane according to claim 2, wherein the phenol resin is carbonized at a temperature of 600 to 900° C.

6. A pervaporation separation method comprising: bringing a supply liquid containing two or more kinds of components into contact with a carbon membrane of claim 2, cooling a gas having passed through the carbon membrane, and separating a resultant as a permeation liquid containing a specific component.

7. The carbon membrane according to claim 1, wherein at least one species selected from the group consisting of water, alcohol, ether, and ketone is loaded on a surface and/or in pores of the carbon membrane.

8. The carbon membrane according to claim 3, wherein the phenol resin is carbonized at a temperature of 600 to 900° C.

9. A pervaporation separation method comprising: bringing a supply liquid containing two or more kinds of components into contact with a carbon membrane of claim 7, cooling a gas having passed through the carbon membrane, and separating a resultant as a permeation liquid containing a specific component.

10. The carbon membrane according to claim 1, wherein the phenol resin is carbonized at a temperature of 600 to 900° C.

11. A pervaporation separation method comprising: bringing a supply liquid containing two or more kinds of components into contact with a carbon membrane of claim 10, cooling a gas having passed through the carbon membrane, and separating a resultant as a permeation liquid containing a specific component.

12. A pervaporation separation method comprising: bringing a supply liquid containing two or more kinds of components into contact with a carbon membrane of claim 1, cooling a gas having passed through the carbon membrane, and separating a resultant as a permeation liquid containing a specific component.

13. The pervaporation separation method according to claim 12, the method comprising: bringing the supply liquid containing an acidic component into contact with the carbon membrane, cooling a gas having passed through the carbon membrane, and separating the resultant as a permeation liquid containing a specific component.

14. The pervaporation separation method according to claim 6, wherein the acidic component is hydrochloric acid, sulfuric acid, or nitric acid.

15. The pervaporation separation method according to claim 13, wherein a content of the acidic component is 0.001 to 0.2% by mass with respect to the total amount of the supply liquid.

* * * * *

UNITED STATES PATENT AND TRADEMARK OFFICE
CERTIFICATE OF CORRECTION

PATENT NO. : 8,945,390 B2
APPLICATION NO. : 13/621391
DATED : February 3, 2015
INVENTOR(S) : Akimasa Ichikawa et al.

It is certified that error appears in the above-identified patent and that said Letters Patent is hereby corrected as shown below:

In the Claims

Claim 1, Col. 13, lines 34-35

Please change: "acid aqueous solution at 80°C. for 40 hours, and immersion in a 70% acetic acid aqueous solution at 80°C. for" to -- acid aqueous solution at 80°C. for 40 hours, and immersion in a 10% nitric acid aqueous solution at 80°C. for --

Signed and Sealed this
Twenty-fifth Day of August, 2015

Michelle K. Lee
*Director of the United States Patent and Trademark Office*